United States Patent Office 3,773,735
Patented Nov. 20, 1973

3,773,735
PROCESS FOR THE MANUFACTURE OF POLYOLEFINS
Bernd Diedrich and Karl Diether Keil, Frankfurt am Main, Germany, assignors to Farbwerke Hoechst Aktiengesellschaft vormals Meister Lucius & Brüning, Frankfurt am Main, Germany
No Drawing. Continuation of abandoned application Ser. No. 656,358, July 27, 1967. This application Aug. 26, 1971, Ser. No. 175,319
Claims priority, application Germany, Aug. 9, 1966, F 49,907
Int. Cl. C08f 1/56, 3/06
U.S. Cl. 260—88.2 R                         5 Claims

ABSTRACT OF THE DISCLOSURE

A process for homopolymerizing ethylene or copolymerizing ethylene with up to 10% by weight of higher $\alpha$-olefins having 3 to 15 carbon atoms in solution, suspension or in the gaseous phase at a temperature in the range of from 20 to 250° C. with a mixed catalyst comprising a trivalent, chlorine-containing titanium compound and an organo-aluminum compound, with regulation of the average molecular weight by means of hydrogen, which comprises carrying out the polymerization under a pressure below 10 atmospheres gauge, with regulation of the average molecular weight with hydrogen, using as catalyst 0.05 to 0.3 millimole of a trivalent chlorine containing titanium compound per liter of dispersing agent or solvent or per 0.5 liter of reactor volume and an organo-aluminum compound in an amount corresponding to 0.1 to 3.0 millimoles of aluminium per liter of dispersing agent or solvent or reactor volume, the organo-aluminum compound being (a) an aluminum hydrocarbon of the formula $AlR_3$ in which R stands for a hydrocarbon radical having 4 to 40 carbon atoms, or
(b) a reaction product of a trialkylaluminum or an alkylaluminumhydride with diolefins having 4 to 20 carbon atoms.

---

This application is a continuation application of Ser. No. 656,358, filed July 27, 1967, now abandoned.

The present invention relates to a process for the manufacture of polyolefins.

It is known that $\alpha$-olefins and mixtures thereof can be polymerized by the Ziegler low pressure polymerization process. As catalysts there are used compounds of the elements of subgroups IV to VI of the Periodic Table in admixture with organo-metal compounds of the elements of Groups I to III of the Periodic Table. Polymerization is generally carried out in suspension, or in solution, or also in the gaseous phase. The molecular weight favorable for the further processing of the polymer is regulated by means of the polymerization temperature, the ratio of the mixed catalyst components or by adding foreign gases, especially hydrogen. In the known processes with regulation of the molecular weight high catalyst concentrations are mostly used so that after polymerization it is indispensable to remove the catalyst constituents. Too high a proportion of catalyst constituents in the polymer causes corrosions on the manufacturing machines by reactive halogen, or discolorations when the polymer is exposed to high temperatures or by reaction with additives such as, for example, stabilizers.

Processes have been proposed in which small amounts of catalyst yield high amounts of polymer so that the removal of the catalyst can be dispensed with. The polymers obtained by these processes have, however, a very high molecular weight and, therefore, they can be used only for a limited number of applications unless the high molecular weight is reduced to an average molecular weight by thermal, thermomechanical or oxidative methods. This degradation of the polymer generally yields a material having a narrow molecular weight distribution which is only suitable for certain fields of application.

Still further, processes have been proposed in which high amounts of polymer are obtained per catalyst unit with Ziegler type mixed catalysts and regulation of the molecular weight, which processes also permit a direct processing of the polymers without removal of the catalyst residues. They require, however, a relatively high polymerization pressure necessitating additional equipment pertaining to apparatus. According to Belgian Pat. 665,702 pressures in the range of from 35 to 70 atmospheres are preferably used, which are generally not applied in Ziegler low pressure polymerization processes.

The present invention provides a process for homopolymerizing ethylene or copolymerizing ethylene with up to 10% by weight of higher $\alpha$-olefins having 3 to 15 carbon atoms in solution, suspension or in the gaseous phase at a temperature in the range of from 20 to 250° C. with a mixed catalyst comprising a trivalent, chlorine-containing titanium compound and an organo-aluminum compound, with regulation of the average molecular weight by means of hydrogen, which comprises carrying out the polymerization under a pressure below 10 atmospheres gauge, preferably 2 to 6 atmospheres gauge, with regulation of the average molecular weight with hydrogen, using as catalyst 0.05 to 0.3 millimole of a trivalent chlorine containing titanium compound per litre of dispersing agent or solvent or per 0.5 litre of reactor volume and an organo-aluminum compound in an amount corresponding to 0.1 to 3.0 millimoles of aluminium per litre of dispersing agent or solvent or reactor volume, the organo-aluminum compound being (a) an aluminum hydrocarbon of the formula $AlR_3$ in which R stands for a hydrocarbon radical having 4 to 40 carbon atoms, preferably 4 to 12 carbon atoms, or
(b) a reaction product of a trialkylaluminum or an alkylaluminumhydride with diolefins having 4 to 20 carbon atoms, for example isoprenylaluminum.

The process of the invention can be carried out in solution, in suspension or in the gaseous phase at a temperature in the range of from 20 to 250° C., preferably 70 to 120° C., in suspension or in the gaseous phase.

As titanium component there is used a trivalent titanium compound, such as titanium trichloride or titanium-alkoxy-chloride, obtained by reduction of titanium-tetrachloride or chloroalkoxy-titanate of the general formula $Ti(OR)_{4n-}Cl_nCl_n$ in which $n$ stands for a number in the range of 1 to 4 and R represents a hydrocarbon radical having 2 to 8 carbon atoms, by means of alkylaluminum sesquichloride and/or dialkylaluminum monochloride and/or isoprenylaluminum in an inert dispersing agent at a temperature in the range of from $-60°$ C. to $+70°$ C., preferably $-30°$ C. to $0°$ C., if desired with a subsequent thermal treatment at 60 to 150° C. and washing with an inert dispersing agent.

To regulate the molecular weight in the course of polymerization pure hydrogen is used in an amount such that the hydrogen content in the gaseous phase ranges between 1 and 80% by volume according to the desired range of the molecular weight.

When the polymerization is carried out with the catalyst concentrations and pressure conditions defined above and trimethyl-aluminum, triethylaluminum or tripropylaluminum are used and hydrogen is added, it comes to a standstill after a short period of time, whereas according to the invention using tri-isobutylaluminum, trioctylaluminum or tridodecylaluminum, and particularly tri(2-methylpentyl)-aluminum or isoprenylaluminum, the reaction product of tri-isobutylaluminum with isoprene (according to Belgian Pat. 601,855 and U.S. Pat. 3,180,837), high polymer yields are obtained of more than 1 kilogram of polymer per millimole of titanium compound and the polymer has a low molecular weight and a low ash content. The titanium and chlorine content of the polymer is below 50 or 100 p.p.m., respectively, so that it may be processed without removal of the catalyst residues.

When the molecular weight is not regulated by means of hydrogen and a higher amount of catalyst than according to the invention is used, a high molecular weight polymer having a high ash content is obtained which is only useful in a limited field of application. When a smaller amount of catalyst is used than proposed according to the invention and an organo-aluminum compound is used carrying lower alkyl radicals, the polymer yield decreases and the speed of polymerization diminishes far below a value required in an industrial process.

It is particularly surprising that under a pressure below 10 atmospheres gauge, preferably 2 to 6 atmospheres gauge, the polymerization takes place at a high speed which permits the manufacture of polymers within the pressure range of the Ziegler low pressure polymerization process. The decisive influence of the type of the alkyl-aluminum compound to be used according to the invention can be seen from the following table.

The table reveals that polymers and copolymers having the advantageous properties of a low ash content without additional treatment and a molecular weight suitable for numerous fields of application can only be obtained by the process according to the invention when the following conditions are observed: the titanium component of the catalyst is used in an amount of less than 0.3 millimole per litre of dispersing agent, the aluminum component of the catalyst is a compound of the formula $AlR_3$ in which R stands for a hydrocarbon radical having 4 to 40 carbon atoms or a reaction product of trialkylaluminum compounds or alkylaluminum hydrides with a di-olefin having 4 to 20 carbon atoms, the molecular weight is regulated with hydrogen and the polymerization is carried out under a pressure of less than 10 atmospheres gauge.

According to the process of the invention a polymer is obtained which is especially suitable for extrusion and blowing processes. When the polymerization is carried out in solution or in suspension the inert aliphatic, alicyclic and aromatic hydrocarbons generally used in Ziegler low pressure polymerization processes can be used, for example pentane, hexane, heptane or gasoline and diesel oil fractions.

The condition for a high polymerization speed and a high catalyst yield is, however, a high purity of the monomers used and of the solvent or dispersing agent. In the first place, care must be taken that all impurities which inactivate the titanium component in spite of an excess of the aluminum component are excluded. Impurities of this type are, for example, acetylenes, carbon monoxide or dinitrogen oxide. Other impurities such as oxygen, water, or carbon dioxide are removed by an excess of the aluminum hydrocarbon and have no disturbing action in a concentration of a few parts per million. According to their concentration they only require an additional amount of aluminum hydrocarbon in order to obtain a high polymerization speed.

The ethylene can be thoroughly purified, for example, according to the process disclosed in South African specification 66/5,869. The dispersing agent can be purified by known methods, for example by distillation over organo-aluminum compounds.

The polymerization of the α-olefins can be carried out continuously or discontinuously. In the case of a suspension polymerization the polymer is separated from the dispersing agent in an atmosphere of an inert gas and dried. When air and moisture are excluded, the dispersing agent can be reused for another polymerization without any intermediate treatment. In this case it is simply necessary to add the amounts of aluminum- and titanium-compound necessary for a sufficient polymerization speed.

It has been surprising and unforeseen that by the combination of the defined isolated trivalent titanium compounds with higher aluminum hydrocarbons or with reaction products of alkylaluminum compounds with diolefins and with regulation of the molecular weight by means of hydrogen high catalyst yields can be obtained. The important progress of the present invention resides in the fact that in the pressure range usually applied in Ziegler low pressure polymerization processes polyethylene or copolymers of ethylene can be produced having the desired molecular weight and other advantageous properties without the titanium component being removed and without or with partial elimination only of the aluminum component of the mixed catalyst.

The following examples serve to illustrate the invention but they are not intended to limit it thereto. The experiments were carried out in a vessel having a capacity of 150 litres and being provided with stirring means under a pressure of 5 to 7 atmospheres gauge. The dispersing agent was a hydrocarbon fraction boiling at 130 to 170° C. which had been freed from impurities by distillation of a mixture thereof with trialkylaluminum compounds and was carefully handled under nitrogen. The α-olefins to be polymerized such as ethylene, propylene or butene-1 had been purified by a treatment with a copper catalyst as disclosed in the specification referred to above. After polymerization the polymer suspension was filtered through a pressure filter under nitrogen and the polymer was dried by passing over nitrogen of 120° C. To regulate the molecular weight pure hydrogen was used.

EXAMPLE 1

(a) 100 litres of dispersing agent were saturated with ethylene and pure hydrogen in a ratio such that the hydrogen content in the gaseous phase amounted to about 60 to 70% by volume. 28.2 millilitres of triethylaluminum (200 millimoles) and 20 millimoles of titanium trichloride (prepared as described in German Pat. 1,109,894) were added and the content of the vessel was heated to 85° C.

| Example No. | Hydrocargon radical R in the formula $AlR_3$ | Ti IV-compound for the reduction to Ti-III | Reduction of Ti IV with— | Polymer yield, kg./l millimole Ti after hrs. | End of ethylene absorption after hrs. | Polymer reduced specific viscosity |
|---|---|---|---|---|---|---|
| 1(a) | $-C_2H_5$ | $TiCl_4$ | $Al(C_2H_5)_{1.5}Cl_{1.5}$ | 0.6 | 1.5 | 7.5 |
| 1(b) | $-iC_4H_9$ | $TiCl_4$ | $Al(C_2H_5)_{1.5}Cl_{1.5}$ | 3.1 | 7.5 | 3.6 |
| 1(c) | $-CH-CH_2-CH_2-CH_2-CH_3$<br>    $\|$<br>   $CH_3$ | $TiCl_4$ | $Al(C_2H_5)_{1.5}Cl_{1.5}$ | 1.5 | 6 | 3.0 |
| 1(d) | -isoprenyl | $TiCl_4$ | $Al(C_2H_5)_{1.5}Cl_{1.5}$ | 2.5 | 8.6 | 3.0 |
| 2(bα) | $-C_2H_5$ | $TiCl_4$ | Al-isoprenyl | 0.4 | 1 | 8.5 |
| 2(bβ) | $-iC_4H_9$ | $TiCl_4$ | Al-isoprenyl | 2.2 | 9 | 2.9 |
| 3(bα) | $-C_2H_5$ | $TiCl_2[i-OC_3H_9]$ | $Al(C_2H_5)_{1.5}Cl_{1.5}$ | 0.3 | 1.6 | 7.3 |
| 3(b) | -isoprenyl- | $TiCl_2[i-OC_3H_9]$ | $Al(C_2H_5)_{1.5}Cl_{1.5}$ | 1.95 | 3.5 | 3.1 | while vigorously stirring. Ethylene and hydrogen were introduced in an amount such that the pressure in the vessel was 6 atmospheres gauge and the hydrogen content of the gaseous phase was 50 to 70% by volume. The absorption of ethylene was terminated after 1.5 hours, 12 kilograms of polymer were obtained. The polymer had a high molecular weight (reduced specific viscosity 7.5, determined in a 0.1% solution in decahydronaphthalene at 135° C.), an ash content of less than 300 p.p.m. and a density of 0.960 g/cc.

(b) The polymerization was carried out as described under (a) with the exception that 10 millimoles of $TiCl_3$ and 250 millimoles of triisobutylaluminum were used. Ethylene was absorbed for a period of 7.5 hours with a hydrogen content in the gaseous phase of 50 to 70% by volume. 32 kilograms of polymer were obtained having a reduced specific viscosity of 3.6, an ash content of less than 200 p.p.m. and a density of 0.960 g/cc.

(c) Ethylene was polymerized as described under (a) with 15 millimoles of $TiCl_3$ and 250 millimoles of triisohexylaluminum. After 6 hours 22 kilograms of polymer were obtained having a reduced specific viscosity of 3.0, an ash content of less than 300 p.p.m. and a density of 0.960 g./cc.

(d) The polymerization was carried out as described under (a) with 12 millimoles of $TiCl_3$ and 45 millilitres of isoprenylaluminum. After 8.6 hours 30.3 kilograms of polymer were obtained having a reduced specific viscosity of 3.0 and an ash content of less than 300 p.p.m.

EXAMPLE 2

(a) Preparation of the $TiCl_3$ catalyst 21.6 millilitres (200 millimoles) of titanium tetrachloride were dropped while stirring over a period of 30 minutes and while cooling at −60° C., to a solution of 15 millilitres of isoprenyl-aluminum in 370 millilitres of n-heptane. The solution was then stirred, each time for a further hour, at −40° C., −20° C., 0° C. and +20° C., the $TiCl_3$ precipitate was allowed to settle, the mother liquor was decanted and the precipitate was washed 6 times, each time with 400 millilitres of n-heptane. The brown $TiCl_3$ precipitate was used for the following polymerizations:

(b) Polymerization ($\alpha$) 15 millimoles of $TiCl_3$ and 250 millimoles of triethylaluminum were used. The absorption of ethylene in the polymerization carried out as described under 1(a) was terminated after one hour. 6 kilograms of polymer were obtained having a reduced specific viscosity of 8.5, an ash content of less than 300 p.p.m. and a density of 0.960 g./cc.

($\beta$) The polymerization was carried out as described under 1(a) with the use of 15 millimoles of $TiCl_3$ and 250 millimoles of triisobutylaluminum. 33 kilograms of polymer were obtained after 9 hours having a reduced specific viscosity of 2.9, an ash content of less than 300 p.p.m. and a density of 0.960 g/cc.

EXAMPLE 3

(a) Preparation of a titanium catalyst 80 millilitres of a 1 molar solution of dichlorotitanic acid isopropyl ester $TiCl_2(OiC_3H_7)_2$ in cyclohexane were dropped over a period of 120 minutes while stirring into a solution of 26.8 millilitres of ethylaluminum sesquichloride (120 millimoles) in 333 millilitres of n-heptane. The reaction mixture was stirred for 6 hours at 20° C. and the isopropoxytitanium chloride precipitate was washed as indicated under 2 (a).

(b) Polymerization ($\alpha$) The polymerization was carried out as described under 1(a). 10 millimoles of the isopropoxytitanium chloride catalyst and 250 millimoles of triethylaluminum were used. After 1.6 hours the ethylene absorption was terminated and 3 kilograms of polymer were obtained having a reduced specific viscosity of 7.3, an ash content of less than 300 p.p.m. and a density of 0.960 g./cc.

($\beta$) In the polymerization according to Example 1(a) 46 millilitres of isoprenylaluminum and 10 millimoles of isopropoxytitanium chloride catalyst were used. After 3.5 hours 19.5 kilograms of polymer were obtained having a reduced specific viscosity of 3.1, a density of 0.960 g./cc. and an ash content of less than 300 p.p.m.

EXAMPLE 4

Ethylene containing 3.5% by volume of butene-(1) was polymerized as described in Example 1(a) with 14 millimoles of isopropoxytitanium chloride catalyst and 250 millimoles of isoprenylaluminum for 6 hours under a pressure of 2 atmospheres gauge. 24 kilograms of polymer were obtained having a reduced specific viscosity of 2.1, a butene content of 3.9% by weight, a density of 0.929 g./cc. and an ash content of less than 300 p.p.m. In this example the polymer was dried at 100° C.

What is claimed is:

1. In the process for homopolymerizing ethylene or copolymerizing ethylene with up to 10% by weight of a higher α-olefin having 3 to 15 carbon atoms in solution, suspension or in the gaseous phase at a temperature in the range of from 20 to 250° C. with a mixed catalyst comprising a trivalent chlorine containing titanium compound and an organoaluminum compound, with regulation of the average molecular weight with hydrogen, the improvement which comprises conducting said polymerization under a pressure of 2 to 6 atmospheres gauge, in the presence of 0.05 to 0.3 millimole of titanium trichloride or titaniumalkoxy chloride per litre of dispersing agent or solvent or per 0.5 liter or reactor volume, wherein the titanium trichloride or titanium alkoxy chloride are obtained respectively by the reduction of titanium-tetrachloride or a chloroalkoxy-titanate of the formula $Ti(OR)_{4-n}Cl_n$ in which $n$ is a number in the range of 1 to 4 and R represents a hydrocarbon radical having 2 to 8 carbon atoms, by means of alkylaluminum sesquinchloride, dialkylaluminummonochloride or mixtures thereof in an inert dispersing agent at a temperature in the range of from −60° C. to +70° C., and in the presence of an organoaluminum compound in an amount corresponding to 0.1 to 3.0 millimoles of aluminum per litre of dispersing agent or solvent or reactor volume, said organoaluminum compound being) an aluminum hydrocarbon of the formula $AlR_3$ wherein R stands for a hydrocarbon radical having 4 to 40 carbon atoms, and recovering the resulting polymer without removal of the catalyst.

2. The process of claim 1, wherein the organoaluminum compound is an aluminum hydrocarbon of the formula $AlR_3$ in which R stands for a hydrocarbon radical having 4 to 12 carbon atoms.

3. The process of claim 1, wherein for regulating the average molecular weight pure hydrogen is used in an amount such that the hydrogen content of the gaseous phase is in the range of from 1 to 80% by volume.

4. The process of claim 1, wherein the polymerization in the gaseous phase and in suspension is carried out at a temperature in the range of from 70 to 120° C.

5. Process for the manufacture of polymers and copolymers of ethylene suitable for extrusion and blowing processes according to claim 1, wherein without removal of the catalyst the polymer or copolymer obtained has a titanium content of less than 50 p.p.m. and a chlorine content of less than 100 p.p.m.

(References on following page)

References Cited

UNITED STATES PATENTS

| | | | |
|---|---|---|---|
| 3,232,913 | 2/1966 | Weynbergh et al. | 260—94.9 O |
| 3,180,837 | 4/1965 | Bruce et al. | 260—94.9 B |

FOREIGN PATENTS

| | | |
|---|---|---|
| 6511633 | 3/1966 | Netherlands. |
| 665,702 | 12/1965 | Belguim. |
| 895,595 | 5/1962 | Great Britain. |
| 909,461 | 10/1962 | Great Britain. |
| 960,232 | 6/1964 | Great Britain. |

JOSEPH L. SCHOFER, Primary Examiner

E. J. SMITH, Assistant Examiner

U.S. Cl. X.R.

252—429 C; 260—94.9 E